United States Patent [19]

Burns

[11] 4,196,896

[45] Apr. 8, 1980

[54] PRESSURE RELEASE JACK

[76] Inventor: George W. Burns, 1240 Blairmoor, Grosse Pointe Woods, Mich. 48236

[21] Appl. No.: 946,509

[22] Filed: Sep. 28, 1978

[51] Int. Cl.² ............................................. B23Q 3/10
[52] U.S. Cl. ....................................... 269/20; 92/20; 269/310
[58] Field of Search ................... 269/309, 310, 20, 27, 269/30, 289, 296; 248/411, 412, 402; 92/20, 28; 188/67

[56] References Cited

U.S. PATENT DOCUMENTS

| | | | |
|---|---|---|---|
| 3,272,087 | 9/1966 | Culver | 92/20 |
| 3,998,444 | 12/1976 | Stockwell | 269/310 X |

*Primary Examiner*—Robert C. Watson

*Attorney, Agent, or Firm*—Harness, Dickey & Pierce

[57] ABSTRACT

The jack of the present invention is novel in having a stem extending from a body which is spring pressed from a base to engage an element which thereafter is locked in position to prevent the element from deflecting under load. A pair of studs and nuts are provided within the body between the base and stem which when actuated locks the stem in extending position and prevents the deflection of the element. The application of fluid to a piston within the body releases the stem so that the jack can be removed at the end of the operation on the element. The jack prevents a portion of the element which is not rigidly supported to be retained in fixed position against deflection when being operated on.

9 Claims, 3 Drawing Figures

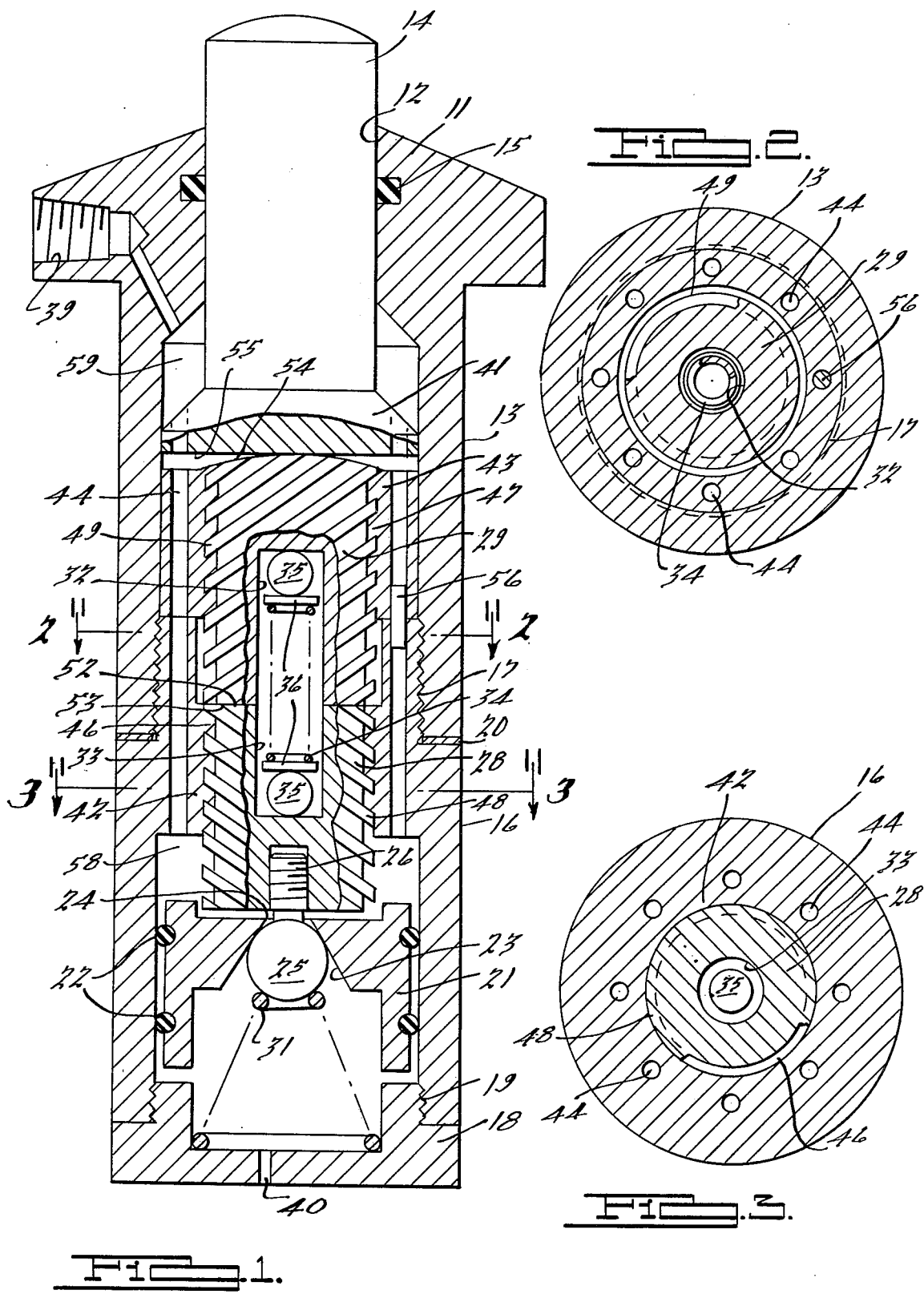

PRESSURE RELEASE JACK

BACKGROUND OF THE INVENTION

Screw jacks have been employed for raising and supporting different structures but such jacks have only a single threaded stud engaged by a threaded nut. Such a thread is of low pitch so that very little, if any, locking could be provided as the nut can be easily rotated.

SUMMARY OF THE INVENTION

The invention pertains to a hollow body having a piston in the bottom section, a pair of fixed nuts along the side wall having a steep thread cut therein which mates with the threads on a pair of studs. The lower stud and nut have a lefthand thread while the top stud and nut have a righthand thread. The top of the top stud is crowned so as to engage a flat surface on the bottom of a stem so that the engaged surfaces can be rotated relative to each other. The stem extends from a top closure element and O-rings are provided for sealing the stem and piston to prevent leakage of a fluid which is delivered within the body and downwardly through passageways in the nuts to move the piston downwardly. The piston is connected with the adjacent threaded stud which is pulled downwardly therewith. The top stud is moved upwardly by a centrally located spring within the pair of studs to have the stem engage the workpiece with a light pressure. The removal of the fluid to tank permits a spring within the piston to move the piston and bottom stud upwardly into engagement with the top stud to form a lock. The downward movement of the stem is prevented as the studs have threads of the opposite hand and of substantial pitch.

BRIEF DESCRIPTION OF THE DRAWING

FIG. 1 is a vertical sectional view of the jack embodying features of the present invention;

FIG. 2 is a sectional view of the jack illustrated in FIG. 1, taken on the line 2—2 thereof, and FIG. 3 is a sectional view of the jack illustrated in FIG. 1, taken on the line 3—3 thereof.

DESCRIPTION OF THE PREFERRED EMBODIMENT

The fluid release jack of the present invention has a closure 11 containing a central aperture 12 at the top of a hollow cylindrical element 13. A stem 14 has an O-ring seal 15 with the aperture 12 of the closure 11. A bottom hollow cylindrical element 16 is threaded at 17 to the top cylindrical element 13 and sealed thereto by a washer 20. A bottom closure member 18 containing a thread 19 engages a thread on the interior bottom portion of the bottom cylindrical element 16. A piston 21 is disposed within the bottom of the bottom cylindrical element 16 which is sealed to the inner wall thereof by O-rings 22. The piston 21 has a hollow interior which contains a truncated conical portion 23 having a central opening 24.

A ball 25 has a threaded stem 26 which extends through the opening 24 at the top of the truncated conical portion 23. The ball engages and seals with the surface of the conical portion 23 when threaded into the bottom of a lefthand threaded stud 28. A righthand threaded stud 29 engages and extends upwardly from the lefthand threaded stud 28 and contacts the bottom of the stem 14 which it supports. A heavy truncated conical spring 31 engages the bottom of the ball 25 with the enlarged end engaging the threaded bottom closure member 18. The spring 31 exerts an upward pressure of approximately 80 pounds on the ball 25 from the bottom threaded stud 28.

A coil spring 34 is provided in aligned cylindrical apertures 32 and 33 on the axis of the threaded studs 28 and 29 which are closed at the top and bottom and which have a ball 35 in each end engaging washers 36 between which the coil spring 34 is disposed. The spring 34 exerts approximately 10 pounds pressure on the threaded studs 28 and 29 for urging them apart. A pair of nuts 42 and 43 surround the studs 28 and 29, the threads 46 and 47 thereof engaging the threads 48 and 49 of the studs 28 and 29 so as to permit the latter to rotate relative thereto. The threads 46 and 47 on the studs 28 and 29 may have the same lead and are four in number on the jack herein illustrated although the number may change. A substantial lead is provided to the threads and this may be as much as one inch or more for a complete turn of the threads.

A pipe thread 39 is provided in the closure 11 of the top cylinder element 13 for receiving a threaded end of a connector (not shown) which has an "off" and "on" valve for introducing a fluid to the jack in the "on" position and returns it to tank in the "off" position. The fluid is directed between the top closure 11 and the enlarged inner end portion 41 at the bottom of the stem 14. The fluid moves downwardly through passages 44 in the nuts 42 and 43 and the enlarged end portion 41 of the stem. The fluid forces the piston 21 to the bottom of the cylindrical element 16 and moves the ball 25 and the stud 28 downwardly in the nut 43 which was machined in the wall of the cylinder element 16. Any fluid leaking past the piston 21 may pass from the aperture 40 in the bottom of the element 18.

The movement of the stud 28 downwardly in the nut 42 causes it to rotate relative to the piston 21 and separate from the stud 29 which is maintained in its upper position within the nut 43 by the spring 34. The top of the stud 29 is crowned at 54 and is in engagement with the flat underside 55 of the enlarged portion 41 of the stem 14. When the valve is again operated after it has directed fluid to the piston 21, the flow of fluid is reversed as it leaves the piston and flows to tank. When this occurs, the spring 31 will become effective to move the ball 25 and the lefthand threaded stud 28 upwardly until the surfaces 52 and 53 are in engagement to form a lock. Since the threads on the stud 28 are lefthanded and those on the stud 29 are righthanded, the engagement of the studs 28 and 29 under substantial pressure locks the studs together and prevents any relative movement therebetween. This locking occurs after the jack has been placed on a base with the top of the stem 14 engaging the under surface of the element to be strengthened against deflection. The engagement is produced by the spring 34 which does not provide a lock between the studs 28 and 29.

The surface 53 of the stud 29 is prepared in a manner to prevent relatively turning between the two surfaces 52 and 53 when locking has occurred between the two studs 28 and 29. One way to produce the nonslippable surface would be to apply a tungsten carbide or similar metal by electrical application or otherwise to the surface which produces a permanent finish which is only slightly roughened. A second method to produce such a lock would be by having the two surfaces 52 and 53 disposed on a slight slope which would prevent the turning of one relative to the other after the lock has been produced therebetween.

The lock is produced by the two studs 28 and 29 after the pressure from the spring 31 has been applied therebetween. The engagement of the jack occurs at a point at the bottom of a workpiece which is unsupported and which may deflect under load when being machined. The application of the jack to the unsupported portion of the workpiece occurs with a minimum pressure and after the fluid is returned to tank, the piston 21 is released and the spring 31 becomes effective to rotate the stud 28 and move it upwardly to have the surfaces 52 and 53 move into locked engagement with each other. This permits the surface of the workpiece opposite to that engaged by the stem 14 to be machined in planar relation with other portions of the workpiece which are rigidly secured in a normal manner.

The jack is released when a fluid, such as a gas or liquid, is applied to the piston 21 for pulling the stud 28 downwardly due to its connection with the ball 25. The spring 31 is compressed permitting the spring 34 to separate the threaded studs 28 and 29. When the jack is placed in position, the stud 29 will have its top arcuate surface 54 engage the flat surface 55 of the enlargement 41 of the stem 14 and permit the turning of the stud 29 relative to the stem 14.

The jack is in position to prevent the deflection of the workpiece at this time and it is only necessary to produce the locking of the stud 29 in this position to prevent the stem 14 from moving downwardly any substantial amount. The lock will occur upon the return movement of the fluid through the valve to tank which permits the piston 21, the ball 25 and the stud 28 to be moved upwardly by the spring 31. The two surfaces 52 and 53 will engage each other and since the threads of the studs 28 and 29 are of the opposite hand, a lock will result and no release can occur except by the use of the fluid.

A pin 56 is secured in one of the plurality of passageways 44 in the two nuts 42 and 43 and since the nut 42 is a part of the element 16, the nut 43 will be fixed thereto against turning. Both nuts are secured in fixed position and the studs 28 and 29 when in engagement with each other cannot rotate since the threads are of the opposite hand. Normally, the studs 28 and 29 can rotate in their respective nuts due to the space 58 above the piston 21 and the space 59 between the closure 11 and the enlarged portion 41 of the stem 14.

What is claimed is:

1. In a pressure operated jack, hollow cylinder means having a top closure portion with an aperture therethrough, a stem in said aperture, locking means within said hollow cylinder means which secures the stem in contact with an element with a predetermined locking force embodying right and left-hand threaded studs, and fixed nuts having threads engaged with the threads of said studs which form said locking means.

2. In a pressure operated jack as recited in claim 1, wherein a piston is provided at the bottom of the hollow cylinder means containing a truncated conical aperture on its central axis, and a ball having a threaded stem which extends through said aperture in engagement with the truncated conical surface when the threaded stem is secured to a threaded aperture on the axis of the adjacent threaded stud.

3. In a pressure operated jack as recited in claim 2, wherein a truncated conical spring is disposed within the hollow piston having the smaller end contacting the ball and the opposite larger end engaging the bottom of said hollow cylinder means for exerting approximately 80 pounds pressure on the ball and the engaged stud.

4. In a pressure operated jack as recited in claim 3, wherein the two threaded studs have facing apertures on the central axes thereof, a ball engaging the bottom of each aperture, and a spring disposed between the balls.

5. In a pressure operated jack as recited in claim 4, wherein the last said spring exerts a pressure of approximately 10 pounds.

6. In a pressure operated jack as recited in claim 5, wherein the bottom of the stem is enlarged and provided with a flat surface, and the adjacent stud has a crowned end in engagement with said flat surface.

7. In a pressure operated jack as recited in claim 6, wherein sealing means are provided between said stem and the wall of the aperture in the cover member and said piston and the inner wall near the bottom of the cylindrical means.

8. In a pressure operated jack, a hollow body, a piston within said body, said body having a passageway for a fluid for operating said piston downwardly within the body, a closure for the top of the body having a cylindrical aperture therethrough, a stem within said aperture, sealing means for the stem and piston, and threaded studs and nuts between said stem and piston which exert a locking pressure on said stem which is released when the piston is moved by said fluid.

9. In a pressure operated jack as recited in claim 8, wherein spring means between said studs produces an initial engagement between said stem and workpiece which is maintained by said locking pressure.

* * * * *